(12) United States Patent
Maghsoodi

(10) Patent No.: US 11,078,058 B2
(45) Date of Patent: Aug. 3, 2021

(54) OVERLOAD CLUTCH ASSEMBLY FOR HOIST

(71) Applicant: GOODRICH CORPORATION, Charlotte, NC (US)

(72) Inventor: Bejan Maghsoodi, Diamond Bar, CA (US)

(73) Assignee: Goodrich Corporation, Charlotte, NC (US)

( * ) Notice: Subject to any disclaimer, the term of this patent is extended or adjusted under 35 U.S.C. 154(b) by 208 days.

(21) Appl. No.: 16/368,435

(22) Filed: Mar. 28, 2019

(65) Prior Publication Data
US 2020/0307971 A1    Oct. 1, 2020

(51) Int. Cl.
| | | |
|---|---|---|
| B66D 5/00 | (2006.01) |
| B66D 5/14 | (2006.01) |
| B64D 1/02 | (2006.01) |
| F16D 7/02 | (2006.01) |
| F16D 15/00 | (2006.01) |
| F16D 43/30 | (2006.01) |
| F16H 1/28 | (2006.01) |
| F16D 121/14 | (2012.01) |

(Continued)

(52) U.S. Cl.
CPC .............. B66D 5/14 (2013.01); B64D 1/02 (2013.01); F16D 7/027 (2013.01); F16D 15/00 (2013.01); F16D 43/30 (2013.01); F16H 1/28 (2013.01); F16D 2121/14 (2013.01); F16D 2125/38 (2013.01); F16D 2125/50 (2013.01)

(58) Field of Classification Search
CPC ... B66D 1/16; B66D 1/22; B66D 1/24; B66D 1/58; B66D 3/22; B66D 3/26; B66D 5/14; F16D 15/00; F16D 43/20; F16D 43/213; F16D 7/027; F16D 2125/38; F16D 2125/50; F16H 2001/2872; F16H 2001/289
See application file for complete search history.

(56) References Cited

U.S. PATENT DOCUMENTS 2,258,159 A * 10/1941 Nardone ............... F02N 15/021
                                                                123/179.31
3,375,734 A *  4/1968 Lemons .................. F16D 21/02
                                                                475/211
(Continued)

FOREIGN PATENT DOCUMENTS

DE         2255942        5/1974
DE      202017105348     12/2018
(Continued)

OTHER PUBLICATIONS

European Patent Office, European Search Report dated Jun. 12, 2020 in Application No. 19213971.5.

*Primary Examiner* — Emmanuel M Marcelo
(74) *Attorney, Agent, or Firm* — Snell & Wilmer L.L.P.

(57) ABSTRACT

A clutch assembly for a hoist may comprise a first epicyclic gear train and a first set of friction disks rotationally coupled to the first epicyclic gear train. A second set of friction disks may be in operable communication with the first set of friction disks. Torque may be transferred between the first set of friction disks and the second set of friction disks by means of a friction coupling between the first set of friction disks and the second set of friction disks. A pinion may be rotationally coupled to the second set of friction disks. A splined portion of the pinion may form an output of the clutch assembly.

17 Claims, 3 Drawing Sheets

(51) Int. Cl.
   *F16D 125/38*        (2012.01)
   *F16D 125/50*        (2012.01)

(56) References Cited

U.S. PATENT DOCUMENTS

| | | | | |
|---|---|---|---|---|
| 3,763,978 | A * | 10/1973 | Crooks | F16H 3/54 |
| | | | | 475/315 |
| 4,275,870 | A * | 6/1981 | Henneman | B66D 1/44 |
| | | | | 254/361 |
| 4,453,430 | A * | 6/1984 | Sell | B66D 1/22 |
| | | | | 475/116 |
| 4,461,460 | A * | 7/1984 | Telford | B66D 1/22 |
| | | | | 188/337 |
| 7,891,641 | B1 * | 2/2011 | Miller | B66D 1/16 |
| | | | | 254/346 |
| 2003/0151037 | A1 * | 8/2003 | O'Fallon | B66D 1/16 |
| | | | | 254/344 |
| 2018/0016123 | A1 | 1/2018 | Chrysadev | |
| 2018/0251349 | A1 * | 9/2018 | Ijadi-Maghsoodi | F16H 1/46 |
| 2019/0016571 | A1 * | 1/2019 | Thirunarayana | B66D 1/12 |

FOREIGN PATENT DOCUMENTS

| | | |
|---|---|---|
| EP | 0720962 | 7/1996 |
| EP | 3095747 | 11/2016 |
| WO | 2012019921 | 2/2012 |
| WO | 2016049622 | 3/2016 |

\* cited by examiner

OVERLOAD CLUTCH ASSEMBLY FOR HOIST

FIELD

The present disclosure relates generally to hoists and, more particularly, to overload clutch assemblies for hoists.

BACKGROUND

Hoists are devices used to mechanically lift and/or lower loads (e.g., cargo, persons, etc.). Hoists may include a motor-driven cable drum around which a cable winds and/or unwinds. The hoist applies a pulling force to the load through the cable in order to control and/or move the load from one physical location to another physical location. Hoists are used in many environments, including aircraft, automobile, and truck applications, as well as anchor systems, cable cars, cranes, elevators, escalators, mine operations, moving sidewalks, rope tows, ski lifts, tethers, etc. A load exceeding a load rating for the hoist can put the aircraft, the crew, the hoist, and/or the load at risk.

SUMMARY

A clutch assembly for a hoist is disclosed herein. In accordance with various embodiments, the clutch assembly may comprise a first epicyclic gear train and a first set of friction disks rotationally coupled to the first epicyclic gear train. A second set of friction disks may be in operable communication with the first set of friction disks. Torque may be transferred between the first set of friction disks and the second set of friction disks via a friction coupling between the first set of friction disks and the second set of friction disks. A pinion may be rotationally coupled to the second set of friction disks. A splined portion of the pinion may form an output of the clutch assembly.

In various embodiments, the first epicyclic gear train may comprise a stationary ring gear, a plurality of star gears configured to rotate about an inner circumference of the stationary ring gear, and a carrier coupled to the plurality of star gears.

In various embodiments, a basket may be configured to transfer toque to the first set of friction disks. In various embodiments, the carrier of the first epicyclic gear train may be rotationally coupled to the basket. In various embodiments, a ball ramp assembly may rotationally couple the carrier to the basket.

In various embodiments, the carrier may define an auxiliary gear. In various embodiments, a material of the carrier may be different from a material of the plurality of star gears.

In various embodiments, a second epicyclic gear train may be rotationally couple to the pinion. The pinion may form a sun gear of the second epicyclic gear train.

A hoist is also disclosed herein. In accordance with various embodiments, the hoist may comprise a cable drum and a motor configured to rotationally drive the cable drum. A drive train may be rotationally coupled to the cable drum. A clutch assembly may be rotationally coupled between the drive train and the motor. The clutch assembly may comprise a first epicyclic gear train rotationally coupled to the motor, a first set of friction disks rotationally coupled to the first epicyclic gear train, a second set of friction disks in operable communication with the first set friction disks, and a pinion rotationally coupled to the second set of friction disks and the drive train. Torque may transferred between the first set of friction disks and the second set of friction disks via a friction coupling between the first set of friction disks and the second set of friction disks In various embodiments, the first epicyclic gear train may comprise a stationary ring gear, a plurality of star gears configured to rotate about an inner circumference of the stationary ring gear, a carrier coupled to the plurality of star gears, and a sun gear intermeshed with the plurality of star gears. In various embodiments, a housing may be located around the clutch assembly. The stationary ring gear may be coupled to at least one of the housing or the cable drum.

In various embodiments, a shaft may be rotationally coupled to the motor and the sun gear. In various embodiments, a basket may be rotationally coupled to the carrier and the first set of friction disks. In various embodiments, a ball ramp assembly may rotationally couple the carrier to the basket.

In various embodiments, a material of the carrier may be different from a material of the plurality of star gears. In various embodiments, the drive train may comprise a second epicyclic gear train, and the pinion may form a sun gear of the second epicyclic gear train.

A hoist for an aircraft is also disclosed herein. In accordance with various embodiments, the hoist may comprise a cable drum and a motor configured to rotationally drive the motor. A clutch assembly may be in operable communication with the cable drum and the motor. The clutch assembly may comprise a first epicyclic gear train, a first set of friction disks rotationally coupled to the first epicyclic gear train, and a second set of friction disks in operable communication with the first set of friction disks with torque being transferred between the first set of friction disks and the second set of friction disks via a friction coupling between the first set of friction disks and the second set of friction disks. The second set of friction disks may be rotationally coupled to cable drum.

In various embodiments, the first epicyclic gear train may comprise a stationary ring gear, a plurality of star gears configured to rotate about an inner circumference of the stationary ring gear, a first sun gear intermeshed with the plurality of star gears, and a carrier coupled to the plurality of star gears.

In various embodiments, a pinion may be intermeshed with the second set of friction disks. A second epicyclic gear train may be rotationally coupled to the clutch assembly. The pinion may form a sun gear of the second epicyclic gear train. In various embodiments, at least a portion of the clutch assembly may be located within the cable drum.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

DETAILED DESCRIPTION

This detailed description of exemplary embodiments references the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein described without departing from the scope and spirit hereof. Thus, this detailed description is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact. Cross hatching and surface lines may be used throughout the figures to denote different parts but not necessarily to denote the same or different materials.

An overload clutch for a hoist is disclosed herein. The overload clutch may be configured to prevent the aircraft or hoist from experiencing extreme loading conditions. In accordance with various embodiments, the overload clutch may include an epicyclic (or "planetary") gear train input and may provide a sun gear output. An epicyclic gear train input and sun gear output may allow for a more compact gearbox, as compared to conventional overload clutch designs, which tend to employ spur gears for the clutch input and output.

Figure 1:
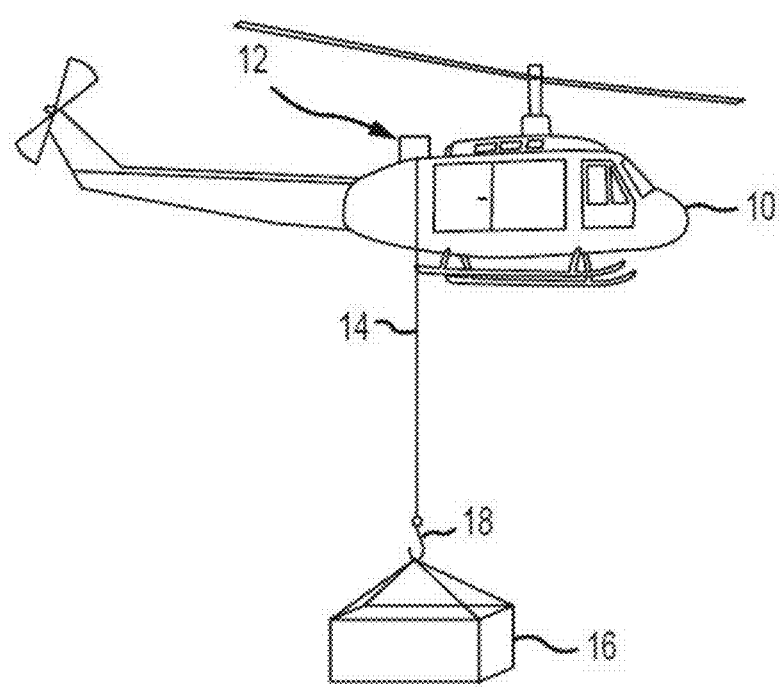
FIG. 1 illustrates an aircraft having a hoist, in accordance with various embodiments.

Referring now to FIG. 1, an aircraft 10, such as a helicopter, is illustrated, in accordance with various embodiments. Aircraft 10 may be used for search and rescue missions. A hoist 12 is attached to a support of aircraft 10. Hoist 12 may be used to extend and/or retract (e.g., lower and/or raise, respectively) a cable 14 (e.g., a wire-rope) connected to a load 16 via a hook 18 and/or the like. In various embodiments, the load 16 placed on the hoist 12 can exceed a load rating for the hoist 12, thereby putting the aircraft 10, the hoist 12, and/or the load 16, etc. at risk.

Figure 2:
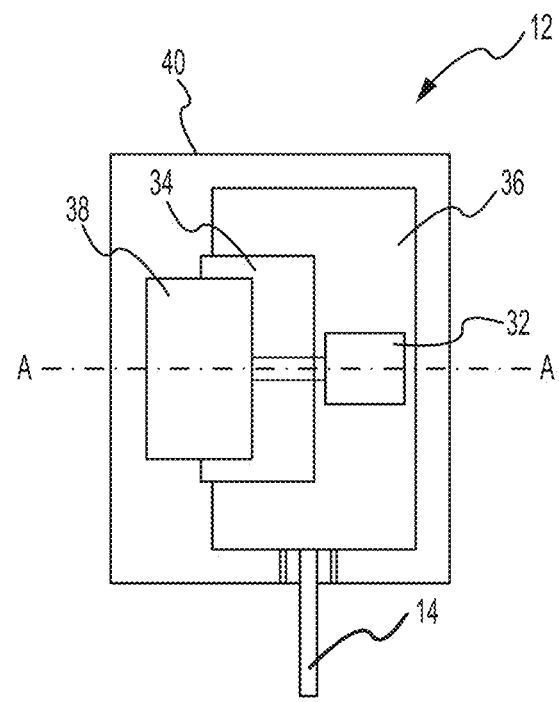
FIG. 2 illustrates a schematic block diagram of a hoist, in accordance with various embodiments.

Referring now also to FIG. 2, a schematic block diagram of hoist 12 is illustrated, in accordance with various embodiments. Hoist 12 includes a motor 32, a drive train 34, a cable drum 36, and an overload clutch assembly 38 (referred to herein as clutch assembly 38). Motor 32 may be electrically, hydraulically, pneumatically, and/or manually driven. Cable drum 36 is configured to rotate about a cable drum axis A-A in order to deploy and retrieve the cable 14 from the cable drum 36. Motor 32 is configured to provide rotational power to drive a rotation of cable drum 36. Motor 32 is rotationally coupled to cable drum 36 via clutch assembly 38 and drive train 34. In accordance with various embodiments, clutch assembly 38 may be operationally coupled between motor 32 and drive train 34, such that an input gear of clutch assembly 38 is rotationally coupled to motor 32 and an output gear of clutch assembly 38 is rotationally coupled to drive train 34. Drive train 34 is rotationally coupled between the output of clutch assembly 38 and cable drum 36. In various embodiments, drive train 34 comprises a plurality of gears interfacing between the clutch assembly 38 and cable drum 36. Cable 14 is wound and/or unwound about the cable drum 36, in response to rotation of cable drum 36 about cable drum axis A-A.

Clutch assembly 38 is configured to provide overload protection to hoist 12, to objects supported by hoist 12 (e.g., load 16), and/or to objects supporting hoist 12 (e.g., aircraft 10). The location of the components of hoist 12 shown in FIG. 2 is for purposes of illustration and not of limitation, it is contemplated and understood that motor 32 may be located on the opposite side of clutch assembly 38 as compared to drive train 34 and/or cable drum 36. In various embodiments, at least a portion of motor 32 and clutch assembly 38 may be located within cable drum 36.

Figure 3A:
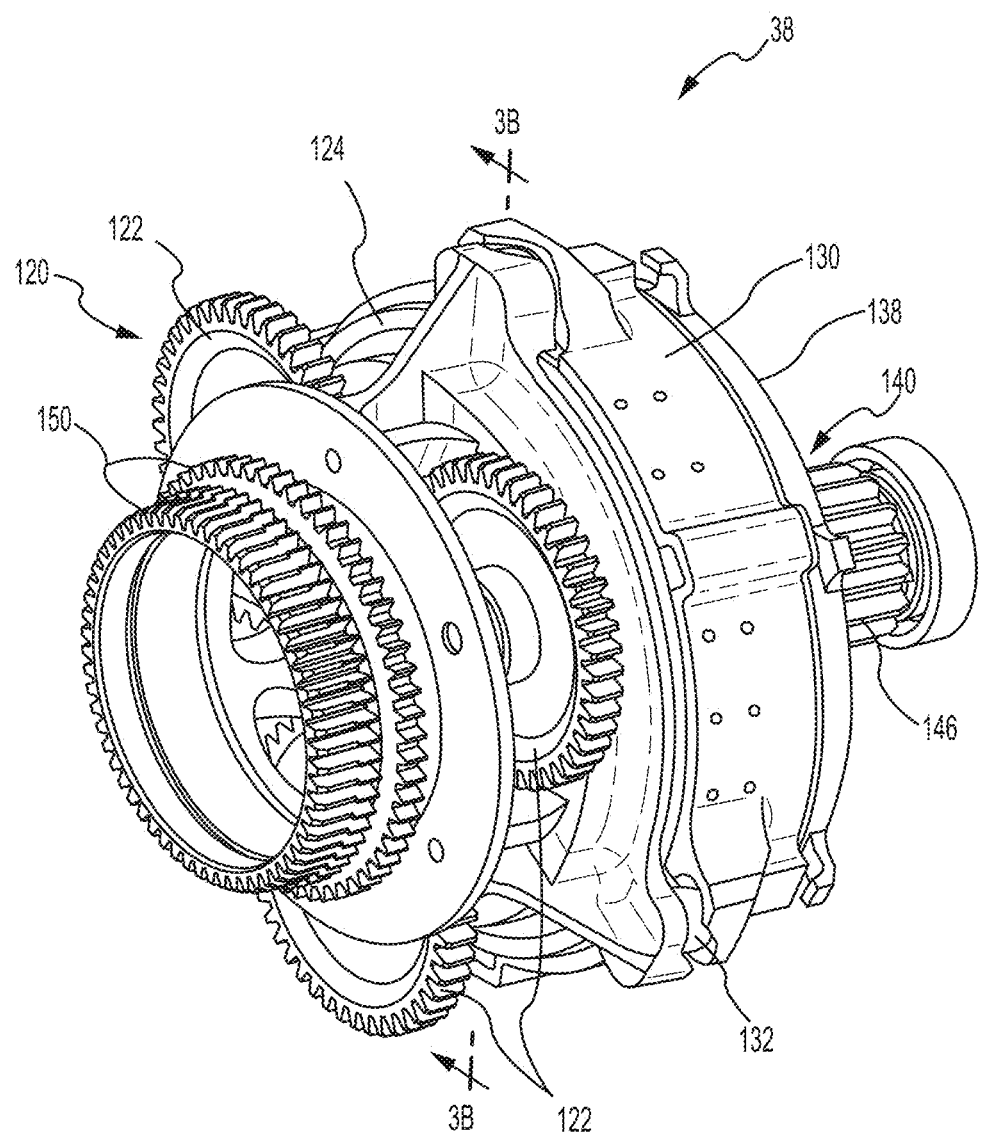
FIG. 3A illustrates perspective view of an overload clutch assembly, in accordance with various embodiments.
Figure 3B:
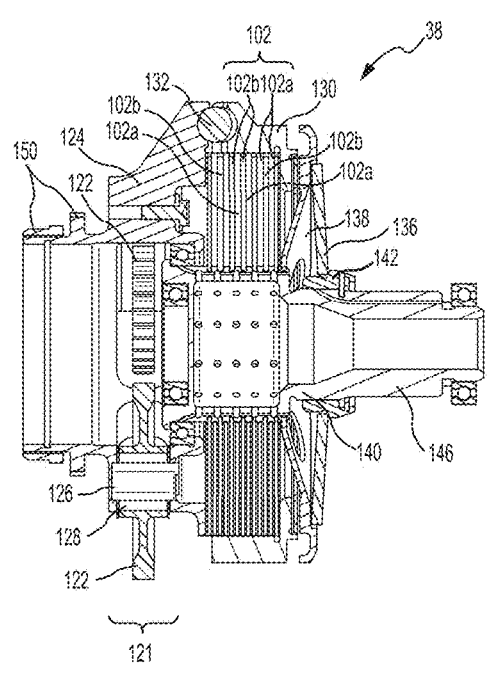
FIG. 3B illustrates a cross-section view of the overload clutch assembly of FIG. 3A taken along the line 3B-3B in FIG. 3A, in accordance with various embodiments.

Referring to FIGS. 3A and 3B, clutch assembly 38 is illustrated, in accordance with various embodiments. Clutch assembly 38 includes a plurality of friction disks 102 configured to slip at predetermined load levels, such as twice a rated capacity of hoist 12. For example, plurality of friction disks 102 may include a first set of friction disks 102a and a second set of friction disk 102b interleaved with friction disks 102a. Friction disk 102a are in operable communication with friction disks 102b with torque being transferred between friction disks 102a and friction disks 102b via a friction coupling between friction disks 102a and friction disks 102b. During a slip, the friction coupling between friction disks 102a and friction disks 102b may be overcome such that less or no torque is transferred. For example, during a slip, friction disks 102b may rotate at a faster speed or a greater rotations per minute (rpm), as compared to friction disks 102a. When friction disks 102 of clutch assembly 38 slip, they disconnect motor 32 from cable drum 36, allowing cable drum 36 to rotate independently of motor 32 and un-spool cable 14 in response to the overload condition. In various embodiments, friction disks 102a and 102b may be made from steel and/or comprise a steel disk therebetween.

During normal (i.e., non-slip) conditions, friction disks 102a and 102b of clutch assembly 38 act in unison, such as acting as a rigid member and/or translating rotational motion within clutch assembly 38. Friction disks 102a and 102b are configured to slip relative to one another when the load 16 on the cable 14 exceeds a slip threshold. For example, in various embodiments, a slip threshold defined by friction disks 102a and 102b may be approximately twice a rated load capacity of the hoist 12. For example, if hoist 12 has a rated load capacity of 600 pounds (272 kg), friction disks 102a and 102b are configured to slip if forces exerted on the hoist 12 exceed approximately 1,200 pounds (544 kg), with approximately meaning, in this case only, ±10%. As such, friction disks 102a and 102b are configured to intentionally slip in order to allow the cable 14 to unspool from the cable drum 36 during an overload condition, including without damaging aircraft 10, hoist 12, load 16, and/or other equipment.

Figure 4:
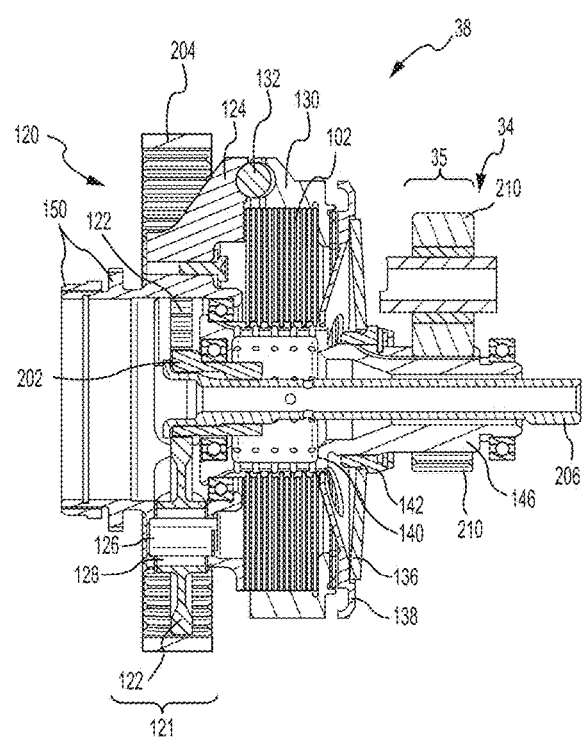
FIG. 4 illustrates a cross-section view of an input and output coupled to an overload clutch assembly, in accordance with various embodiments.

Clutch assembly 38 includes a first (or input) gear system 120. Input gear system is rotationally coupled to motor 32 of FIG. 2. In accordance with various embodiments, the input gear system 120 comprises an epicyclic gear train 121. Epicyclic gear train 121 includes a plurality of star gears 122 supported by a carrier 124 and in meshing engagement (i.e., intermeshed) with a sun gear 202 (FIG. 4) and a ring gear 204 (FIG. 4). With combined reference to FIG. 2 and FIG. 4, sun gear 202 of epicyclic gear train 121 is rotationally driven by motor 32. In various embodiments, sun gear 202 may be mounted to a shaft 206, for example, by splined interface. Shaft 206 is rotationally driven by motor 32. In this regard, shaft 206 may be rotationally coupled to motor 32. Stated differently, motor 32 may rotate shaft 206. Torque generated by rotation of shaft 206 is transferred to sun gear 202. The torque generated by rotation of sun gear 202 is transferred to star gears 122.

Ring gear 204 of epicyclic gear train 121 is configured to be a stationary, non-rotating component of the input gear system 120. Ring gear 204 may be coupled to, or otherwise supported by, a non-rotating component of hoist 12. For example, ring gear 204 may be mounted to a housing 40 of hoist 12 and/or to a non-rotating structure within cable drum 36. Housing 40 may be located around (or radially outward from) clutch assembly 38 and/or motor 32.

Returning to FIGS. 3A and 3B, in various embodiments, each star gear 122 is coupled to carrier 124 of epicyclic gear train 121 via a pin 126. In various embodiments, a bearing 128 may be located between star gear 122 and pin 126. Pin 126 and bearing 128 are configured to rotationally couple star gear 122 to carrier 124 such that the torque generated by rotation of star gears 122 about an inner circumference of ring gear 204 is transferred to carrier 124. In various embodiments, carrier 124 defines one or more auxiliary gears 150. In various embodiments, auxiliary gears 150 may be located at an end of carrier 124 that is opposite friction disks 102. In various embodiments, auxiliary gears 150 may be rotationally coupled to and may drive an auxiliary power train.

Carrier 124 is rotationally coupled to a basket 130 that houses friction disks 102. In various embodiments, carrier 124 is rotationally coupled to basket 130 via one or more ball ramp assemblies 132. In this regard, torque generated by rotation of carrier 124 is transferred to basket 130 via ball ramp assemblies 132. The torque generated by rotation of basket 130 is transferred to friction disks 102. In various embodiments, the first set of friction disks 102a are keyed at their outer circumference with basket 130 and the second set of friction disk 102b are keyed at their inner circumferential surface with a pinion 140. Stated differently, friction disks 102a are intermeshed at their outer circumference with basket 130 and friction disk 102b are intermeshed at their inner circumferential surface with pinion 140. In this regard, friction disks 102a are rotationally coupled to basket 130 such that torque generated by rotation of basket 130 is transferred to frictions disks 102a, and friction disks 102b are rotationally coupled to pinion 140 such that torque generated by rotation of friction disk is transferred to pinion 140. In various embodiments, clutch assembly 38 includes a disk spring 136, for example, a Belleville spring, configured to apply a biasing force against a pressure plate 138. In various embodiments, an adjustment nut 142 is located adjacent disk spring 136. Adjustment nut 142 may be configured to block or prevent translation of disk spring 136 away from pressure plate 138. In this regard, adjustment nut 142, disk spring 136, and pressure plate 138 may be configured to preload (i.e., apply a pressure to) friction disks 102. Stated differently, adjustment nut 142, disk spring 136, and pressure plate 138 may be configured to axially compress friction disks 102. The axial compression of friction disk may generate a friction coupling between friction disks 102a and 102b with torque being transferred between friction disks 102a and friction disks 102b via the frictional coupling. In various embodiments, a thrust bearing may be located between pressure plate 138 and basket 130.

In accordance with embodiments, pinion 140 comprises a splined portion 146. Splined portion 146 is located outside or exterior to basket 130. Splined portion 146 is configured to form an output gear of clutch assembly 38. In this regard, and with combined reference to FIG. 4 and FIG. 3A, splined portion 146 may be rotationally coupled (e.g., intermeshed) with gears 210 of drive train 34. In various embodiments, drive train 34 may comprise an epicyclic gear train 35. Gears 210 may form the star gears of epicyclic gear train 35. Splined portion 146 of pinion 140 (i.e., the output gear of clutch assembly 38) may form the sun gear of epicyclic gear train 35. A radially inward surface of cable drum 36 is splined and may be intermeshed with gears 210 such that cable drum 36 forms the ring gear of epicyclic gear train 35. Torque generated by rotation of splined portion 146 may be transferred to gears 210. The torque generated by rotation of gears 210 is transferred to cable drum 36, thereby causing cable drum 36 to rotate about cable drum axis A-A.

In various embodiments, carrier 124 may be formed from a metal or metal alloy (e.g., steel, stainless steel, aluminum, etc.). Star gears 122, sun gear 202, ring gear 204, splined portion 146, and/or gears 210 may be formed from a metal or metal alloy. In various embodiments, carrier 124 may be formed of a different material (e.g., a lighter weight material) as compared to the material of star gears 122, sun gear 202, ring gear 204, splined portion 146, and gears 210. Carrier 124 may be formed of a lighter, less rigid material, as carrier 124 does not form a splined interface with the gears of input gear system 120 and/or with the output gear (i.e., pinion 140) and/or with the gears of drive train 34. For example, in various embodiments, carrier 124 is formed of aluminum and star gears 122, sun gear 202, ring gear 204, splined portion 146, and gears 210 are formed of steel.

Forming the input and output gear systems of clutch assembly 38 as epicyclic gear train 121 and epicyclic gear train 35, respectively, allows for a more compact clutch assembly, as compared to clutch assembly employing spur gear input and output systems. The compact size of clutch assembly 38 may allow clutch assembly 38 to be located within cable drum 36. A more compact clutch assembly 38 tends to reduce an overall size and weight of hoist 12.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A clutch assembly for a hoist, comprising:
a first epicyclic gear train including a stationary ring gear, a plurality of star gears configured to rotate about an inner circumference of the stationary ring gear, and a carrier coupled to the plurality of star gears;
a first set of friction disks rotationally coupled to the first epicyclic gear train;
a second set of friction disks in operable communication with the first set of friction disks, wherein torque is transferred between the first set of friction disks and the second set of friction disks via a friction coupling between the first set of friction disks and the second set of friction disks;
a basket configured to transfer toque to the first set of friction disks;
a ball ramp assembly rotationally coupling the carrier of the first epicyclic gear train to the basket; and
a pinion rotationally coupled to the second set of friction disks, wherein a splined portion of the pinion forms an output of the clutch assembly.

2. The clutch assembly of claim 1, wherein the carrier defines an auxiliary gear.

3. The clutch assembly of claim 2, wherein a material of the carrier is different from a material of the plurality of star gears.

4. The clutch assembly of claim 1, further comprising a second epicyclic gear train rotationally coupled to the pinion, wherein the pinion forms a sun gear of the second epicyclic gear train.

5. A hoist, comprising:
a cable drum;
a motor configured to rotationally drive the cable drum;
a drive train rotationally coupled to the cable drum; and
a clutch assembly rotationally coupled between the drive train and the motor, the clutch assembly comprising:
a first epicyclic gear train rotationally coupled to the motor;
a first set of friction disks rotationally coupled to the first epicyclic gear train;
a second set of friction disks in operable communication with the first set of friction disks, wherein torque is transferred between the first set of friction disks and the second set of friction disks via a friction coupling between the first set of friction disks and the second set of friction disks; and
a pinion rotationally coupled to the second set of friction disks and the drive train.

6. The hoist of claim 5, wherein the first epicyclic gear train comprises:
a stationary ring gear;
a plurality of star gears configured to rotate about an inner circumference of the stationary ring gear;
a carrier coupled to the plurality of star gears; and
a sun gear intermeshed with the plurality of star gears.

7. The hoist of claim 6, further comprising a housing located around the clutch assembly, wherein the stationary ring gear is coupled to at least one of the housing or the cable drum.

8. The hoist of claim 7, further comprising a shaft rotationally coupled to the motor and the sun gear.

9. The hoist of claim 8, further comprising a basket rotationally coupled to the carrier and the first set of friction disks.

10. The hoist of claim 9, further comprising a ball ramp assembly rotationally coupling the carrier to the basket.

11. The hoist of claim 10, wherein a material of the carrier is different from a material of the plurality of star gears.

12. The hoist of claim 5, wherein the drive train comprises a second epicyclic gear train, and wherein the pinion forms a sun gear of the second epicyclic gear train.

13. A hoist for an aircraft, comprising:
a cable drum;
a motor configured to rotationally drive the cable drum;
a clutch assembly in operable communication with the cable drum and the motor, the clutch assembly comprising:
a first epicyclic gear train rotationally coupled to the motor, the first epicyclic gear train including a stationary ring gear, a plurality of star gears configured to rotate about an inner circumference of the stationary ring gear, a first sun gear intermeshed with the plurality of star gears, and a carrier coupled to the plurality of star gears, wherein the motor is configured to rotationally drive the first sun gear;
a first set of friction disks rotationally coupled to the first epicyclic gear train;
a second set of friction disks in operable communication with the first set of friction disks with torque being transferred between the first set of friction disks and the second set of friction disks via a friction coupling between the first set of friction disks and the second set of friction disks, wherein the second set of friction disks is rotationally coupled to the cable drum; and
a pinion intermeshed with the second set of friction disks; and
a second epicyclic gear train rotationally coupled to the clutch assembly, wherein the pinion forms a sun gear of the second epicyclic gear train.

14. The hoist of claim 13, wherein at least a portion of the clutch assembly is located within the cable drum.

15. The hoist of claim 13, wherein the carrier defines an auxiliary gear.

16. The hoist of claim 13, wherein a material of the carrier is different from a material of the plurality of star gears.

17. The hoist of claim 13, wherein the clutch assembly further includes:
   a basket rotationally coupled to the first set of friction disks; and
   a ball ramp assembly rotationally coupling the carrier to the basket.

\* \* \* \* \*